UNITED STATES PATENT OFFICE.

WALTER GLAESER, OF BROOKLYN, NEW YORK.

EXTRACTION OF SOLUBLE POTASSIUM COMPOUNDS FROM POTASSIUM-CONTAINING SILICATES.

1,409,139.  Specification of Letters Patent.  Patented Mar. 7, 1922.

No Drawing.  Application filed March 1, 1920.  Serial No. 362,348.

*To all whom it may concern:*

Be it known that I, WALTER GLAESER, a citizen of the United States, and a resident of Brooklyn, county of Kings, and State of New York, have invented a new and useful Improvement in Extraction of Soluble Potassium Compounds from Potassium-Containing Silicates, of which the following is a specification, the principle of the invention being herein explained and the best mode in which I have contemplated applying that principle so as to distinguish it from other inventions.

The present invention relates to an improved method of extracting soluble potassium compounds from potassium-containing silicates, in which the potassium constituent is in an insoluble and an unavailable form for use as a fertilizer.

My invention, then, consists of the steps hereinafter fully described and particularly pointed out in the claim, the following description setting forth in detail certain steps embodying the invention, such steps constituting, however, but one of the various ways in which the principle of the invention may be used.

In my improved method a quantity of potassium-containing silicate, such, for example, as feldspar, is first ground to a finely divided condition and is then thoroughly intermixed with sodium sulphate and lime. The mixture is then heated in a muffle furnace of suitable construction for a period of about one hour, and at a temperature of about 800 degrees C., with the result that the feldspar, which is of course a double silicate of aluminum and potassium, is converted into a compound silicate of sodium calcium and aluminum, while the potassium content of the silicate is converted into potassium sulphate. The reaction which takes place may be represented by the following equation:—

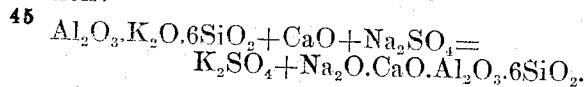

$$Al_2O_3.K_2O.6SiO_2 + CaO + Na_2SO_4 = K_2SO_4 + Na_2O.CaO.Al_2O_3.6SiO_2.$$

It is essential that the operation be carried out in a muffle furnace, that is, in the absence of products of combustion, like water vapor, carbon dioxide and carbon monoxide, as otherwise decomposition of the reagents will occur under liberation of oxides of sulphur which are lost as reagents. This decomposition is indicated by the following reaction equations, the silicate present assisting the decomposition by contact action:—

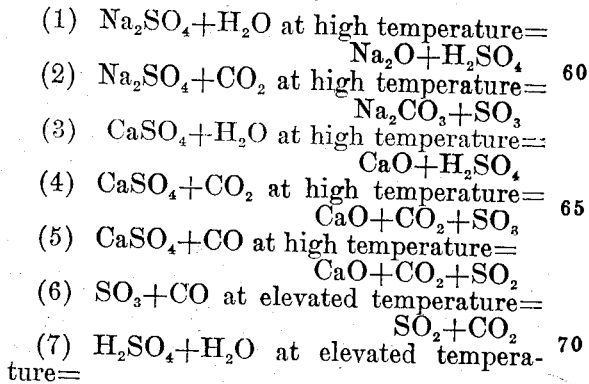

(1) $Na_2SO_4 + H_2O$ at high temperature = $Na_2O + H_2SO_4$ (2) $Na_2SO_4 + CO_2$ at high temperature = $Na_2CO_3 + SO_3$ (3) $CaSO_4 + H_2O$ at high temperature = $CaO + H_2SO_4$ (4) $CaSO_4 + CO_2$ at high temperature = $CaO + CO_2 + SO_3$ (5) $CaSO_4 + CO$ at high temperature = $CaO + CO_2 + SO_2$ (6) $SO_3 + CO$ at elevated temperature = $SO_2 + CO_2$ (7) $H_2SO_4 + H_2O$ at elevated temperature = $H_2O + H_2SO_4$, the $H_2O$ combining with the silicate and again becoming insoluble.

It is understood that the above equations represent the reactions which take place when the gases present, that is the steam, carbon dioxide and the carbon monoxide, are at high temperature.

The potassium sulphate may be leached out and then crystallized as solid potassium sulphate. The furnaced mixture may of course be used directly for agricultural purposes.

The source of the sodium sulphate required for the above treatment is of course immaterial, but it can be very inexpensively made by treating acid sodium sulphate with sodium chloride, and in this way producing sodium sulphate and hydrochloric acid, according to the following equation:

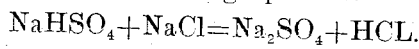

$$NaHSO_4 + NaCl = Na_2SO_4 + HCL.$$

This method constitutes an inexpensive treatment, effective to convert the potassium content of a feldspar into a usable and water-soluble form.

Other modes of applying the principle of my invention may be employed instead of the one explained, change being made as regards the process herein disclosed, provided the step or steps stated by any of the following claim or the equivalent of such stated step or steps be employed.

I therefore particularly point out and distinctly claim as my invention:—

In a method of treating potassium-containing silicates, the steps which consist in grinding a quantity of said mineral to a finely divided condition, thoroughly mixing the same with sodium sulphate and lime, heating the mixture to a temperature of about 800° C. in a closed chamber, leaching the soluble potassium sulphate from the furnace mixture, and crystallizing the potassium sulphate from the liquid so obtained.

Signed by me, this 17th day of January, 1920.

WALTER GLAESER.